(12) United States Patent
Harris et al.

(10) Patent No.: US 8,684,167 B2
(45) Date of Patent: Apr. 1, 2014

(54) LOAD PALLET SLEEVE DISPENSING APPARATUS

(75) Inventors: Christopher Harris, Fishers, IN (US);
Sean Finley, Indianapolis, IN (US)

(73) Assignee: Systec Corporation, Indianapolis, IN (US)

(*) Notice: Subject to any disclaimer, the term of this patent is extended or adjusted under 35 U.S.C. 154(b) by 172 days.

(21) Appl. No.: 13/217,343

(22) Filed: Aug. 25, 2011

(65) Prior Publication Data

US 2012/0048879 A1  Mar. 1, 2012

Related U.S. Application Data

(60) Provisional application No. 61/376,806, filed on Aug. 25, 2010.

(51) Int. Cl.
*B65G 47/66* (2006.01)

(52) U.S. Cl.
USPC ............... 198/468.6; 198/370.08; 198/415; 198/601; 198/809; 414/927

(58) Field of Classification Search
USPC .......... 198/370.06, 370.08, 415, 457.03, 198/463.2, 463.3, 468.6, 601, 809; 414/927, 928, 929
See application file for complete search history.

(56) References Cited

U.S. PATENT DOCUMENTS

| | | | | | |
|---|---|---|---|---|---|
| 3,756,374 | A | * | 9/1973 | Burt et al. ...................... | 198/368 |
| 3,904,044 | A | * | 9/1975 | Lunden ....................... | 414/789.5 |
| 4,926,999 | A | * | 5/1990 | Fauth et al. .................... | 198/358 |
| 4,962,841 | A | * | 10/1990 | Kloosterhouse ......... | 198/370.09 |
| 5,564,264 | A | * | 10/1996 | DeCrane ........................ | 53/251 |
| 5,993,145 | A | * | 11/1999 | Lunden ....................... | 414/789.5 |
| 6,007,295 | A | * | 12/1999 | Sears et al. .................. | 414/789.5 |
| 6,139,254 | A | * | 10/2000 | Ouellette .................... | 414/797.4 |
| 6,561,752 | B2 | * | 5/2003 | Vincent et al. ............. | 414/796.9 |
| 6,609,875 | B1 | * | 8/2003 | Araki .......................... | 414/796.5 |
| 6,644,911 | B2 | * | 11/2003 | Humble et al. ............. | 414/789.5 |
| 6,719,126 | B2 | * | 4/2004 | Badier et al. ................. | 198/809 |
| 6,845,860 | B1 | * | 1/2005 | Walker .......................... | 198/433 |
| 6,866,138 | B2 | * | 3/2005 | Hug .......................... | 198/457.03 |
| 6,942,444 | B2 | * | 9/2005 | Schoenbeck ............... | 414/788.1 |
| 6,974,300 | B1 | * | 12/2005 | Humble et al. ............. | 414/794.3 |
| 7,287,636 | B2 | * | 10/2007 | Itoh et al. .................. | 198/370.1 |
| 7,377,376 | B2 | * | 5/2008 | Hannebauer ................. | 198/407 |
| 7,448,499 | B2 | * | 11/2008 | Roth ............................. | 209/630 |
| 7,651,314 | B2 | * | 1/2010 | Hogue et al. .............. | 414/791.6 |
| 7,717,665 | B2 | * | 5/2010 | Jenkins ...................... | 414/795.2 |
| 8,152,160 | B2 | * | 4/2012 | Ouellette et al. ............. | 271/161 |
| 8,348,591 | B2 | * | 1/2013 | Perl ............................ | 414/789.5 |
| 8,356,458 | B2 | * | 1/2013 | Rubsaamen et al. ........... | 53/447 |

* cited by examiner

*Primary Examiner* — Douglas Hess
(74) *Attorney, Agent, or Firm* — Maginot, Moore & Beck, LLP

(57) ABSTRACT

An apparatus for dispensing a pallet sleeve beneath a load comprises a conveyor component including conveyor elements configured to convey the load thereon in a first direction, one or more stations spaced apart along the first direction and a mechanism for changing the relative vertical positions of the conveyor elements and the stations. The apparatus further includes a pallet sleeve dispenser adjacent the conveyor component and configured for storing pallet sleeves in spaced apart sections aligned with a corresponding station. A drive element associated with each of the stations is configured to engage a pallet sleeve to drive the pallet sleeve from the dispenser to the conveyor component in a second direction substantially perpendicular to the first direction. A retention mechanism is provided to support a stack of pallet sleeves above a lowermost sleeve being driven from the dispenser to the position underneath the load on the conveyor component.

15 Claims, 15 Drawing Sheets

LOAD PALLET SLEEVE DISPENSING APPARATUS

CROSS-REFERENCE TO RELATED APPLICATION

The present application claims priority to and incorporates herein by reference U.S. Provisional Application No. 61/376,806, filed on Aug. 25, 2010, in the name of the same inventors.

BACKGROUND

The present invention relates to the field of dispensing pallet sleeves and especially dispensing pallet sleeves onto conveyors.

Conveyors play a critical role in the packaging and transport of sheet products, such as corrugated sheet material. Conveyors carry a newly manufactured sheet to various stations where stacks of sheets are formed and eventually loaded onto pallets for shipment. In order to optimize control over the sheets and stacks of sheets, many conveyors incorporate powered drive rollers to propel and direct the product.

In many cases, the nature of the product being conveyed may change, which ultimately may modify the transport requirements. For instance, in the corrugated sheet industry, the size of the corrugated panels may change from job to job. Regardless of the size of the corrugated panels, most jobs have similar packaging and transport requirements—i.e., the corrugated sheets are stacked to a predetermined height and loaded onto pallets. The step of loading the stacks onto pallets is relatively straightforward when the size of the sheets in the stack is roughly equal to the size of the pallet. However, when the corrugated sheets are smaller, multiple stacks are loaded onto a single pallet. This scenario complicates the manner in which the stacks are transferred and a given pallet load is built.

What is needed is a sheet stack conveyor apparatus that is adaptable to place a wide range of products onto pallets.

SUMMARY

An apparatus for dispensing a pallet sleeve beneath a load on a conveyor comprises a conveyor component including conveyor elements configured to convey a load thereon in a first direction, one or more stations spaced apart along the first direction and a mechanism for changing the relative vertical positions of the conveyor elements and the stations. The apparatus further includes a pallet sleeve dispenser disposed adjacent the conveyor component and configured for storing pallet sleeves in one or more spaced apart sections. Each section is aligned with a corresponding one of the stations. A drive element is associated with each of the stations and is configured to engage a pallet sleeve to drive the pallet sleeve from the dispenser to the conveyor component in a second direction substantially perpendicular to the first direction.

In one feature, a retention mechanism may be provided to support a stack of pallet sleeves above a lowermost sleeve being driven from the dispenser to the position underneath the load on the conveyor component. The retention mechanism is coordinated to engage the opposite ends of a vertically adjacent pallet sleeve and then disengage the pallet sleeve when the lowermost sleeve has fully exited the dispenser.

DETAILED DESCRIPTION

Figure 1:
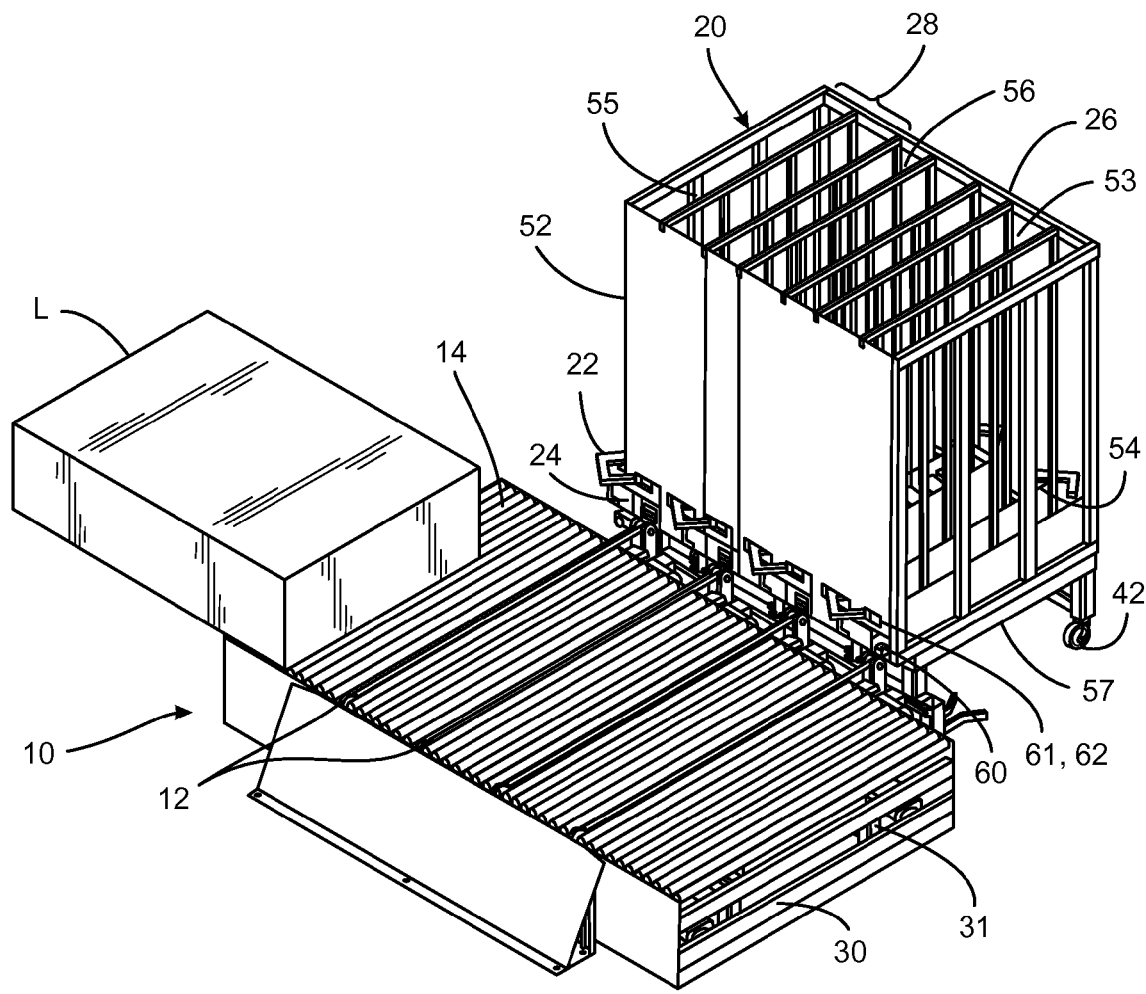
FIG. 1 is a top perspective view of a load entering the apparatus.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

An automatic pallet dispensing apparatus includes a conveyor component 10 and a pallet sleeve dispenser 20, which may be in the form of a mobile cart, as shown in FIG. 1. The conveyor component 10 includes a frame 30 to support roller elements 14 oriented to roll a load L in a first direction along the length of the conveyor component 10. Additional roller elements may be provided in other directions. Although roller elements are shown, other conveyor elements are contemplated that are capable of advancing the load in the first direction, such as belt conveyor elements. In the illustrated embodiment the frame 30 includes four slots or stations 30a-d spaced along the length of the conveyor section, with the stations including up to four drive elements 12 interspersed between roller elements. Of course, the frame 30 may be configured with other numbers of stations and drive elements. Each drive element 12 may be in the form of a belt conveyor supported between a respective front and rear axle (not shown), mounted on a stationary interior frame 31 and oriented to move in a second direction perpendicular to the length of the conveyor component 10. The roller elements 14 and drive elements 12 may span substantially the entire width of the frame. In the illustrated embodiment, the drive elements project beyond the side of the conveyor component 10 underneath the pallet sleeve dispenser 20.

Figure 5:
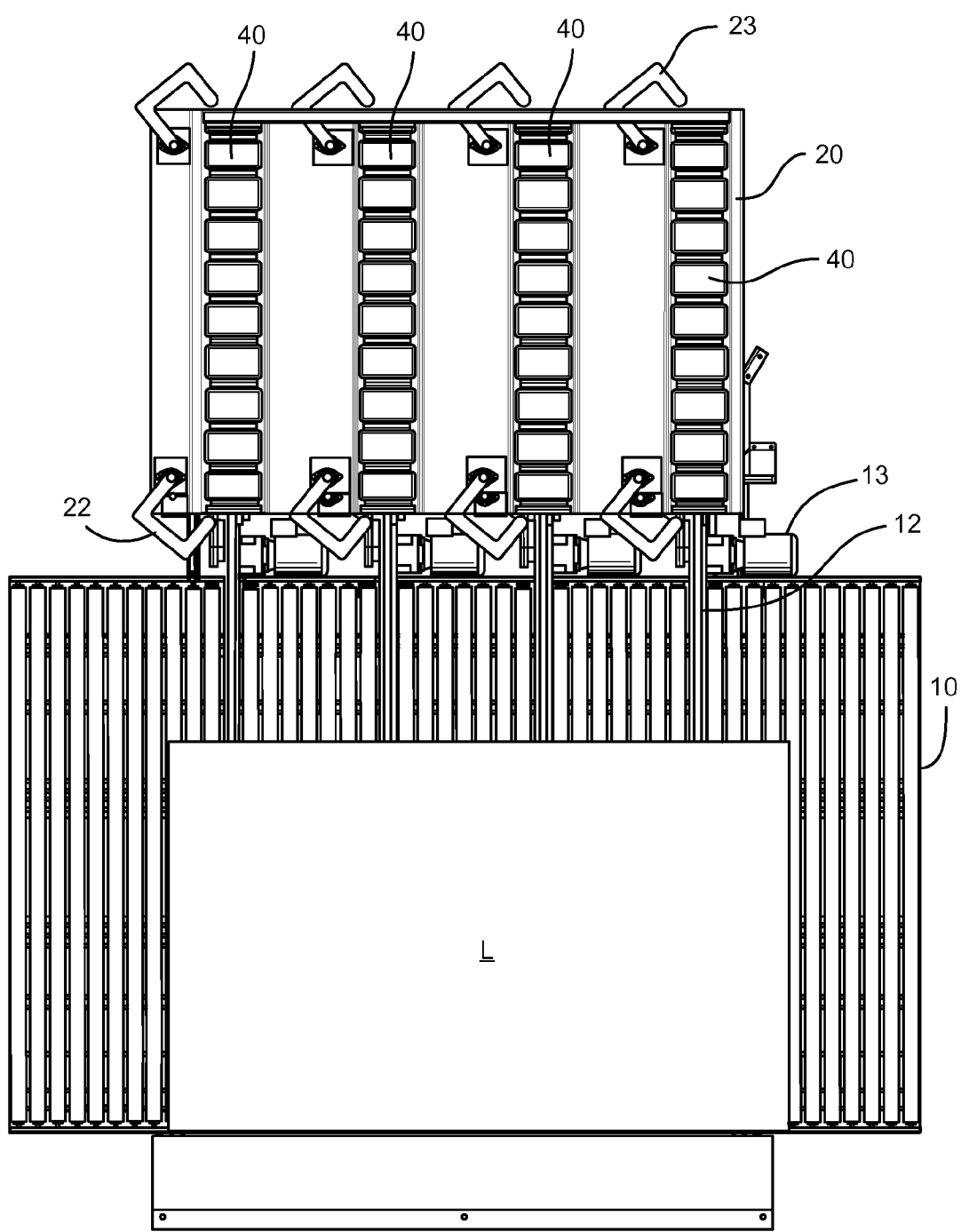
FIG. 5 is a top view of the lifted load of FIG. 3.

A separate drive motor 13 (FIG. 5) can be connected to drive or rotate each drive element 12 across the conveyor component 10 in a direction away from the pallet dispenser 20. The motors and drive elements 12 can be configured in a known manner to drive a plurality of belts, including a single motor configured to simultaneously drive all the belts. An arrangement of belts and motors may be used that is similar to that disclosed in co-pending, commonly-owned U.S. patent application Ser. No. 12/564,805, filed on Sep. 22, 2009, and entitled "Lateral Load Building Conveyor Apparatus", the disclosure of which is incorporated herein by reference. As shown in FIG. 5, each drive element 12 has its own motor 13 so that selected ones of the drive elements may be activated at any given time. In some instances a shorter load L may not require pallet sleeves at all four spaced locations. Individual control of each drive element provides the capability to match the pallet sleeves being dispensed to the length of the load.

In one embodiment, the dispenser 20 is a mobile cart that includes a cart frame 26 having a top 56, bottom 57, front and back ends 52, 53 and lateral sides 54, 55 configured to form a rigid frame. The cart frame 26 may be constructed of bars, as shown in the figures, or alternatively, a fully enclosing material. The bars of the cart frame 26 are spaced a sufficient distance apart to be capable of storing several pallet sleeves 40. In one embodiment, the frame cart 26 is separated into multiple sections 28, each of sufficient width and length to store a pallet sleeve 40, as shown in FIG. 5. The illustrated embodiment depicts a cart frame 26 divided into four sections 27a-d (FIG. 2) corresponding to the stations 30a-d of the conveyor section; however, other numbers of sections may be provided. The sections 27a-d and the stations 30a-d are configured within their respective components to be directly aligned with each other when the pallet sleeve dispenser or cart 20 is adjacent the conveyor component 10. The cart frame 26 may be further configured of a sufficient height to store more than one pallet sleeve 40 vertically in a section 28. For instance, in a specific embodiment the cart has a height for storing a dozen pallet sleeves in each of the sections. The back end 53 of the cart frame 26 may be open to easily load additional pallet sleeves. It is preferred that front end 52 be enclosed as shown in FIG. 1 to prevent a pallet sleeve 40 from being accidentally discharged from the cart.

An opening 60 (FIGS. 1, 4) is provided on the front end 52 corresponding to each of the sections 27a-d to allow a pallet sleeve 40 to exit a corresponding section of the mobile cart 20. A door 24 may be provided to cover at least part of the opening 60 to prevent the pallet sleeve 40 from exiting the mobile cart 20 at an inappropriate time. A U-shaped retention arm 22 may be located slightly above the opening 60 of each section 27a-d. While the arm 22 may be formed of various shapes, it is preferred that the retention arm 22 is of sufficient size to be capable of penetrating the ends of a pallet sleeve. Alternatively, the retention arms 22 may be configured and arranged to fit underneath a pallet sleeve in the stack of sleeves of a cart section. Arm openings 61 and 62 are provided in the closed front end 52 of the mobile cart 20 to allow the arms 22 to swing in and out to hold the next pallet sleeve in place while another pallet sleeve exits through the open door 24 of the mobile cart 20 as described in more detail herein. A set of arms 23 similar to the arms 22 may be provided at the back end 53 of the cart to support and retain the pallets.

Figure 12:
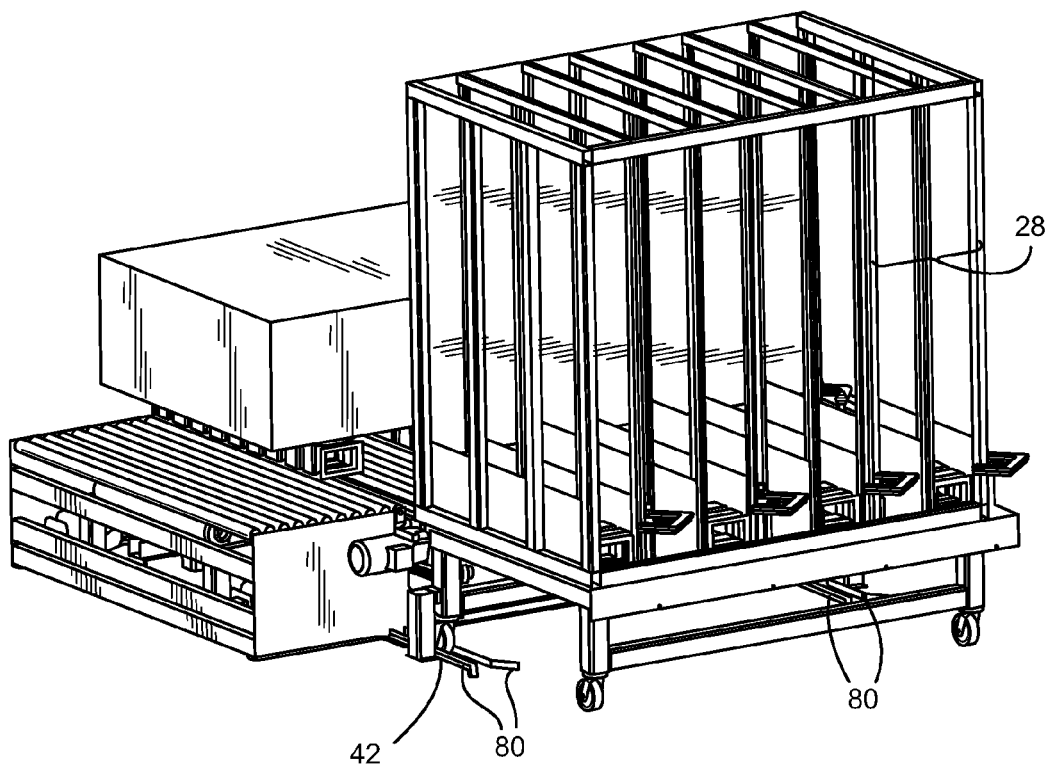
FIG. 12 is a back perspective view of the mobile cart with the retention arms in the open position.

The cart frame 26 may be supported by wheels 42 to facilitate movement of the mobile cart 20. This allows the mobile cart 20 to be placed adjacent to the conveyor component 10 so that the pallet sleeves 40 are aligned with the drive elements 12. The conveyor component 10 may be provided with an alignment mechanism for engaging the cart frame to align the cart with the conveyor section. In one embodiment, the alignment mechanism may include a pair of guide rails 80 forming a track to receive the front wheels 40 of the cart, as shown in FIG. 12. The track ensures proper positioning of the cart relative to the conveyor section. In particular, the guide rails are configured to ensure that when the cart is mated with the conveyor component the drive elements 12 project underneath the pallet sleeves 40 within each section 27a-d. When the mobile cart 20 becomes empty, it may be easily moved from the conveyor component and transported to another station to be filled with additional pallet sleeves, and then returned to the conveyor component 10. Alternatively, the pallet sleeve dispenser 20 may be a stationary device that is loaded with pallet sleeves separately.

Figure 2:
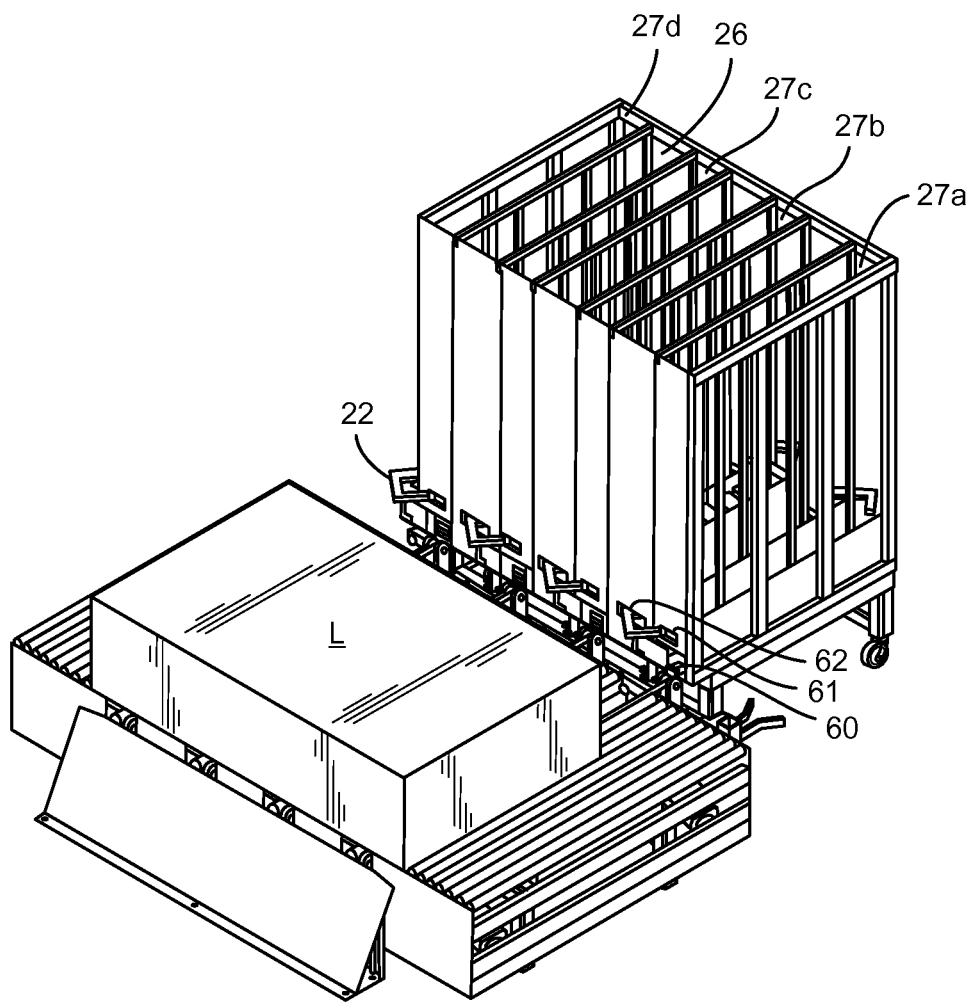
FIG. 2 is a top perspective view of a load positioned on a drive elements.
Figure 3:
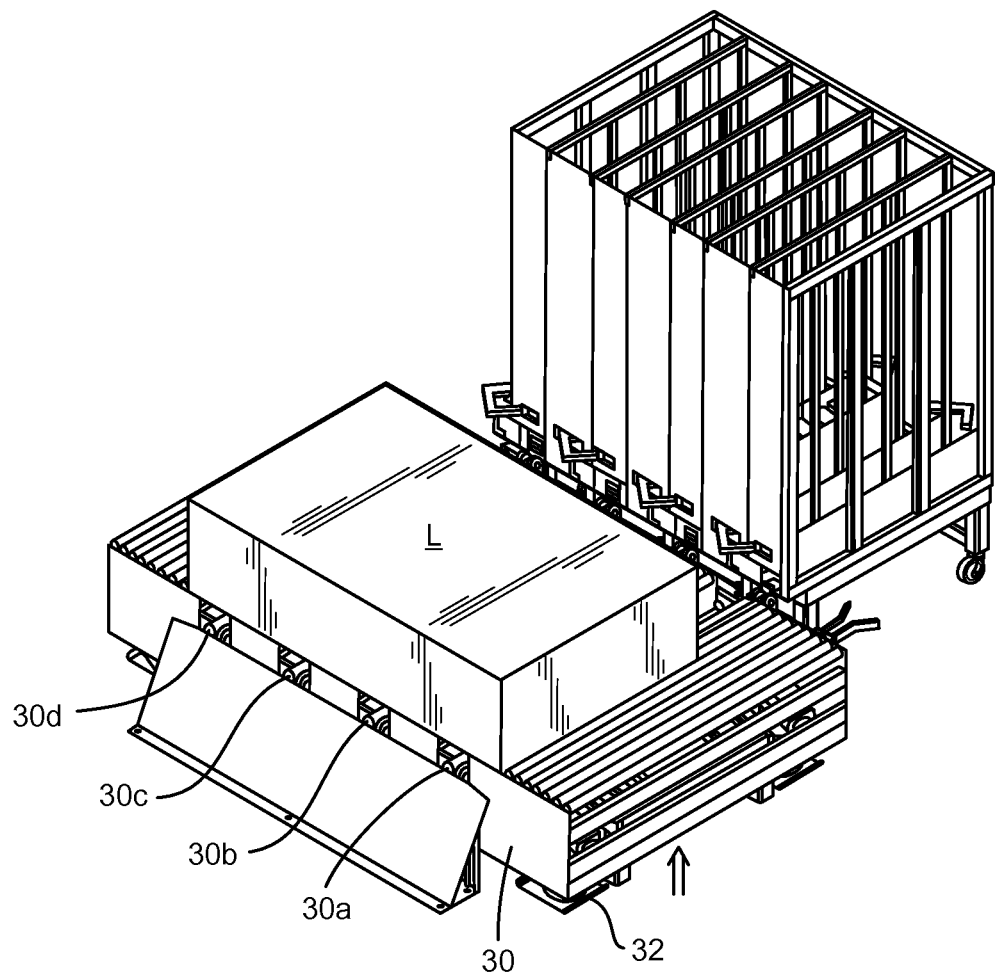
FIG. 3 is a top perspective view of a load lifted to receive pallet sleeves.
Figure 4:
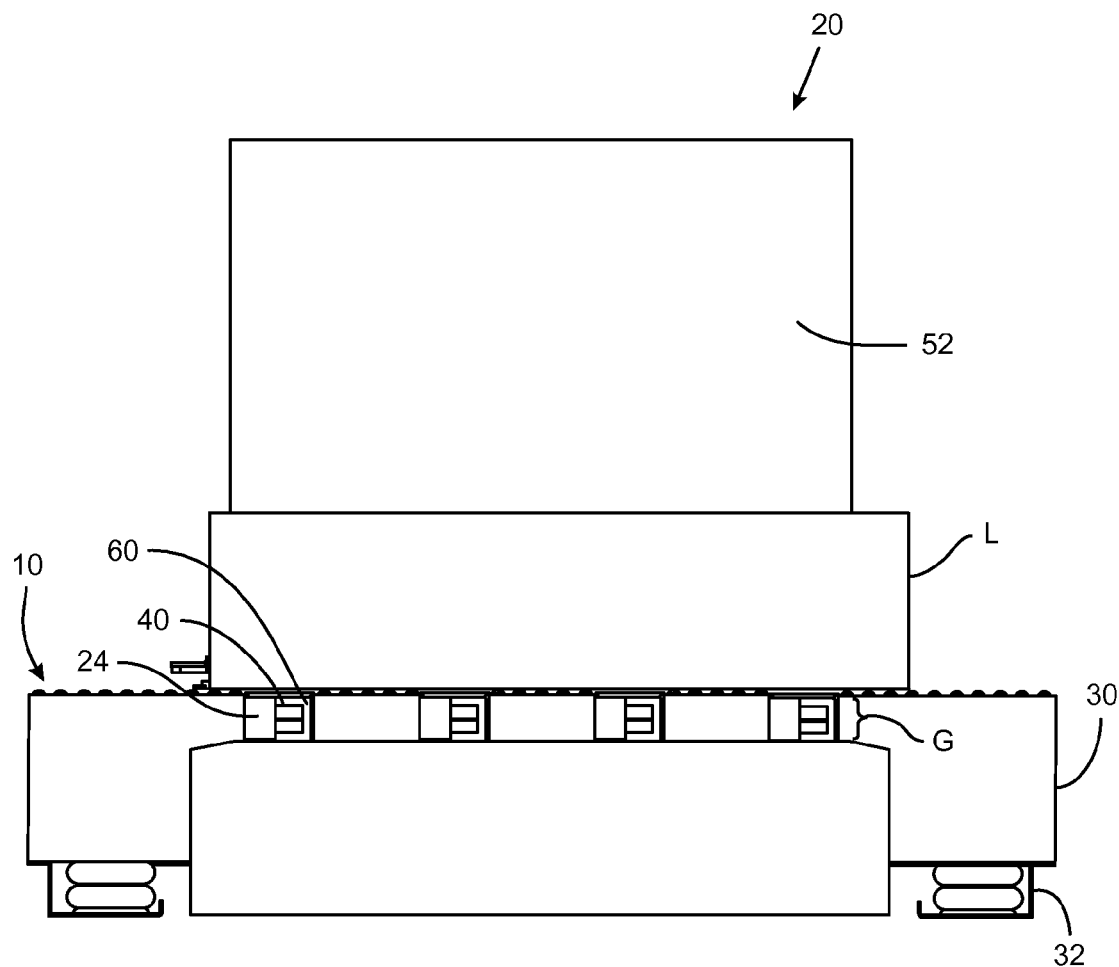
FIG. 4 is a front view of the lifted load of FIG. 3.

As shown in FIGS. 1 and 2, the load L rolls onto the conveyor component 10 and is positioned onto the drive elements 12 in direct alignment with the cart 20. The cart may be provided with an optical sensor or similar device to detect the presence of the load and transmit a signal to the motors driving the roller elements 14 to stop with the load positioned above the drive elements. The load L may cover any number of the drive elements 12. Referring now to FIGS. 3-5, the frame 30 supporting roller elements 14 may be elevated to create a gap G (FIG. 4) of sufficient size to allow a pallet sleeve to enter underneath the load L positioned on the conveyor component 10. A mechanism 32 may be configured to change the relative vertical position between the roller elements 14 and the drive elements 12. In one embodiment, the mechanism is configured to raise and lower the frame 30 relative to the stations 30a-d. Alternatively, the stations (or drive elements 12) may be lowered relative to the roller elements 14 to achieve the gap G. In one specific embodiment, the device 32 includes a number of airbags arranged to uniformly lift the frame 30, although other lifting mechanisms may be used. As shown in the figures, the drive elements 12 remain stationary on the interior frame 31 and are not elevated with the rollers so that the gap G exists between the load and the drive elements, as best seen in FIG. 3. In the position shown in FIGS. 3-5—i.e., when the conveyor rollers are initially elevated—the arms 22 are in their outboard position and the doors 24 are closed as illustrated in FIGS. 1-5.

Figure 6:
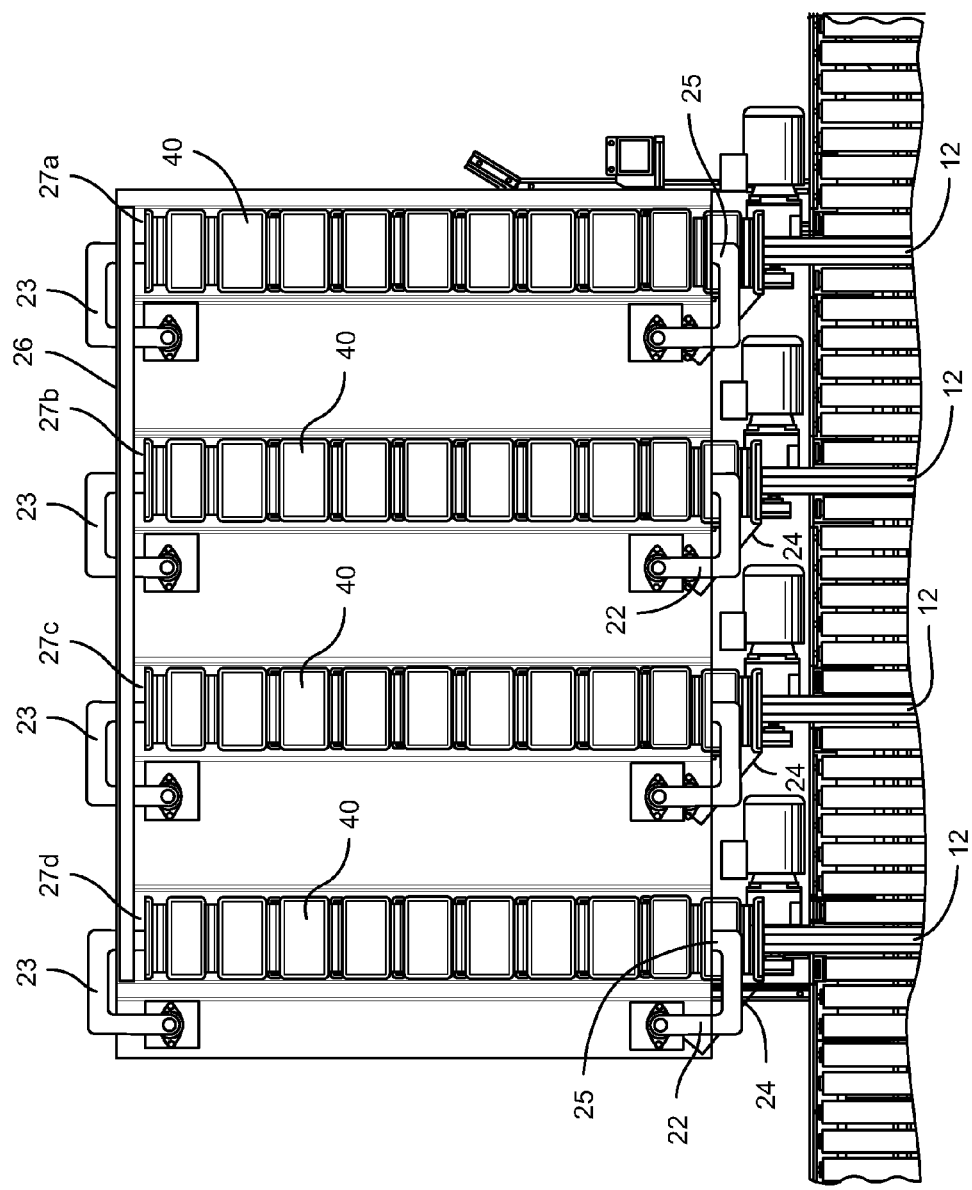
FIG. 6 is a top view of the pallet sleeves exiting a mobile cart pallet sleeve dispenser with retention arms in a closed position.
Figure 7:
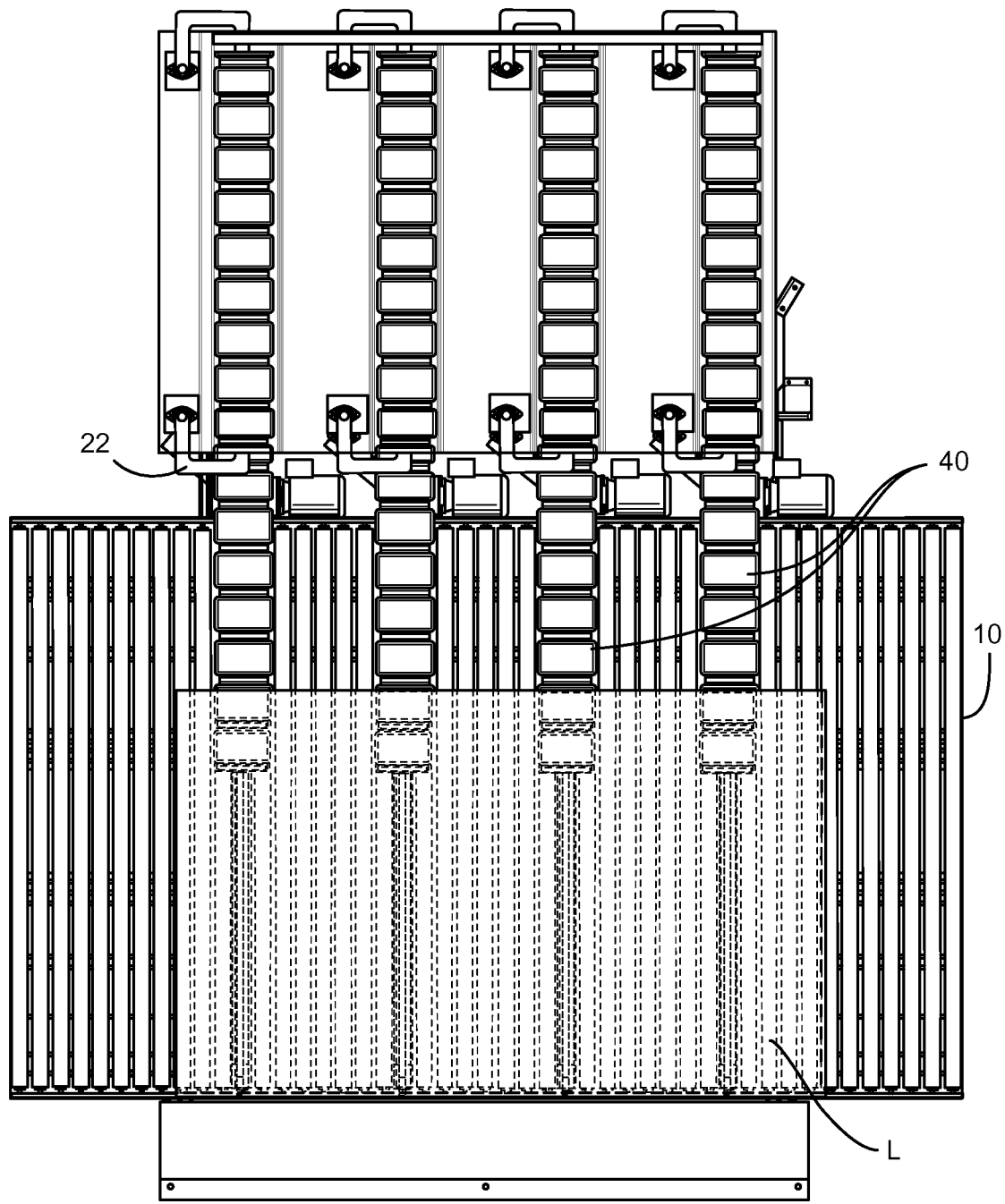
FIG. 7 is a top view of the pallet sleeves entering under the load.
Figure 8:
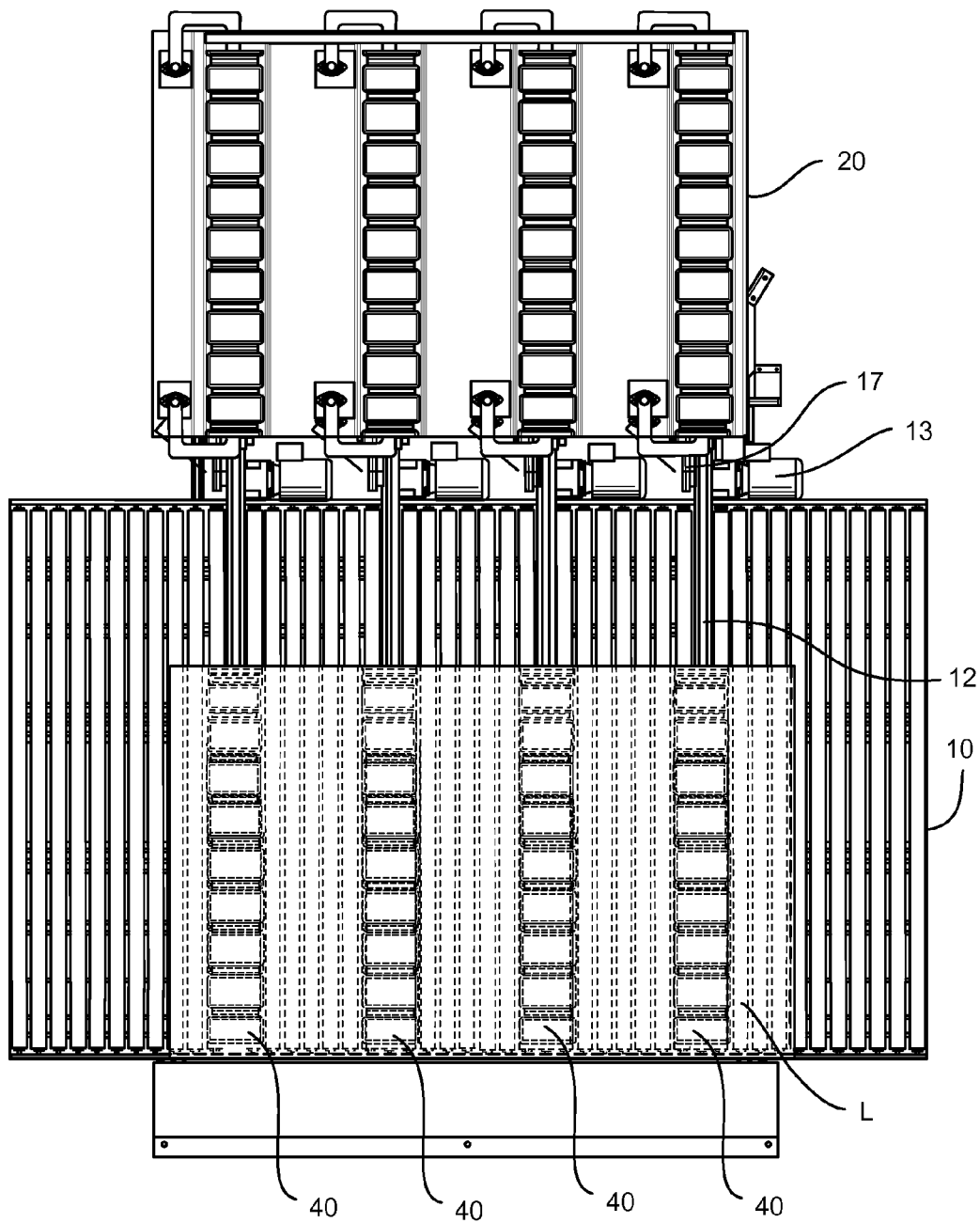
FIG. 8 is a top view of the pallet sleeves completely under the load.

After the conveyor rollers 14 have been lifted, particular drive elements 12 are activated to propel a corresponding pallet sleeve 40 outward into the gap G between the load L and the drive element. As shown in FIG. 6 the pallet sleeves 40 in all four sections 27a-d are propelled forward by the respective drive elements 12. As the pallet sleeves move forward they contact the doors 24 at the openings 60, pushing the doors open, as shown in FIGS. 6-10. The action of the doors 24 opening cause the retention arms 22 to swing inward through the openings 61. As indicated above, the arms 22 are preferably U-shaped, so that each arm includes a prong 25 configured for insertion into the end of the next pallet sleeve situated vertically above the pallet sleeve exiting the cart, as shown in FIG. 6. A like arrangement of similarly configured retention arms 23 are provided at the back end 26 of the cart 20 to engage the opposite end of the next pallet sleeve in line to hold it in place. The retention arms 22, 23 thus serve as a retention mechanism for supporting a pallet sleeve immediately above a sleeve being dispensed beneath the load. Thus, the mobile cart 20 acts as a cartridge or dispenser to hold all the remaining pallet sleeves while allowing the bottom pallet sleeve to be propelled into the gap G beneath the load L. The retention arms continue to hold the remaining stack of pallet sleeves as the bottommost sleeves are driven by a corresponding drive element 12 across the conveyor component (FIG. 7) until the pallet sleeves are all fully disposed under the load (FIG. 8). In one embodiment, the load L and pallet sleeves may be justified at the edge of the conveyor component 10 farthest from the cart 20 to facilitate later movement of the load L. The motors 13 driving the belt members 12 are deactivated when the pallet sleeves fully disposed underneath the load. This deactivation may be timed based on the known travel speed of the belt members, or may be based on detecting the presence of the pallet sleeves in their final position.

Figure 9:
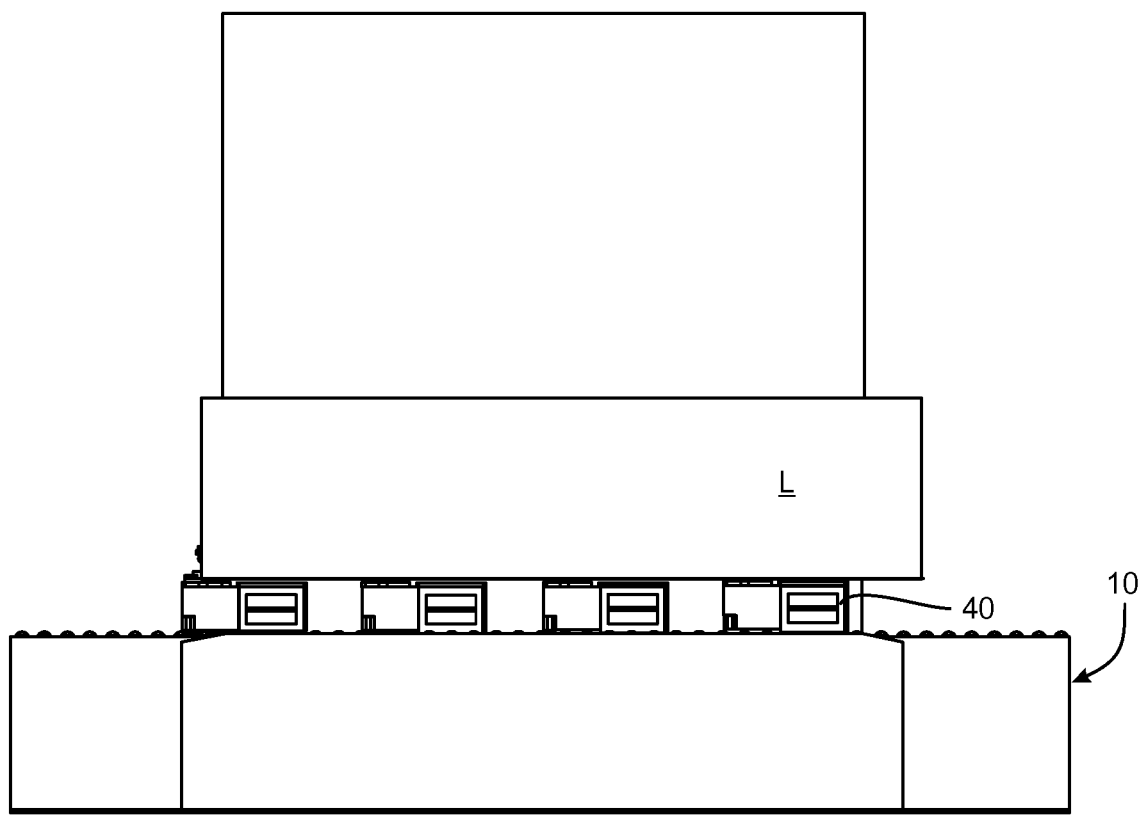
FIG. 9 is a front view of the load after being lowered to rest on the pallet sleeves.
Figure 10:
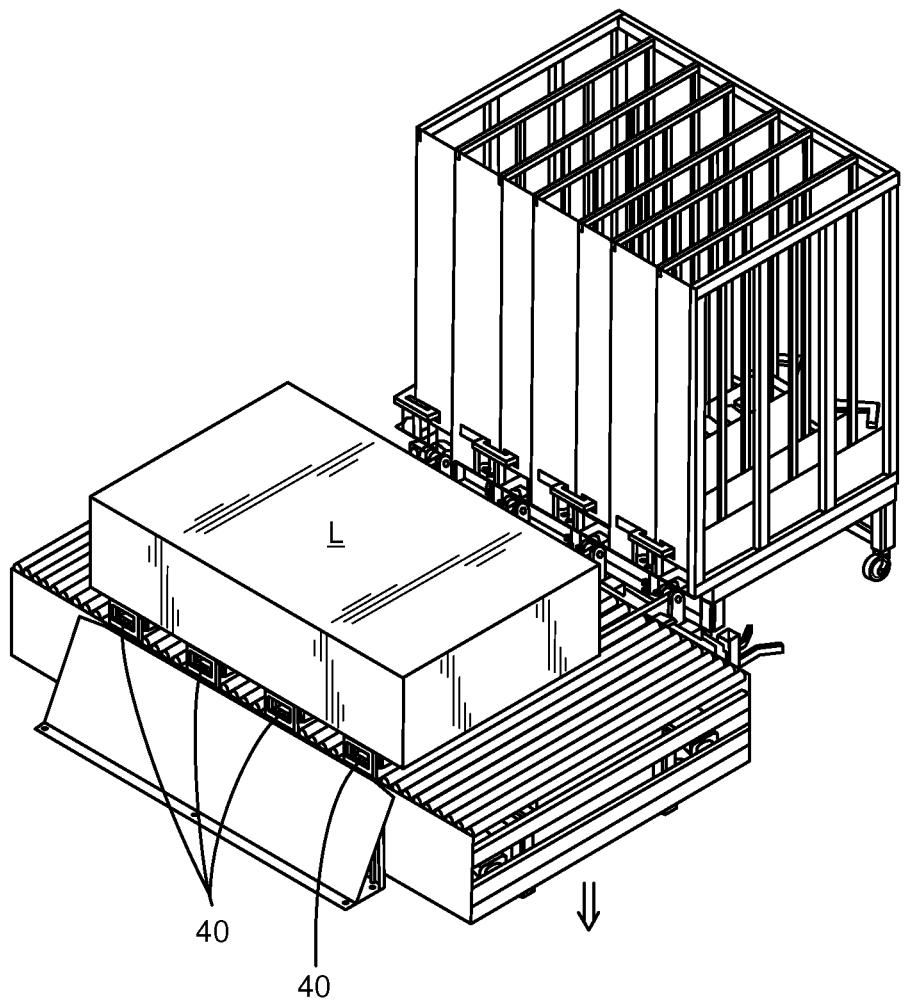
FIG. 10 is a top perspective view of the lowered load shown in FIG. 9.

Once the pallet sleeves are in position, the airbags of the device 32 are deflated to lower the frame 30 of the conveyor component 10 to its original position in line with the drive elements 12, as shown in FIGS. 9-10. In this position the load L rests entirely on the pallet sleeves 40. A fork truck can pick up the load L from the conveyor component 10 using the sleeves or the load L can be advanced along the conveyor component 10 to a subsequent conveyor while resting on the pallet sleeves.

Figure 11:
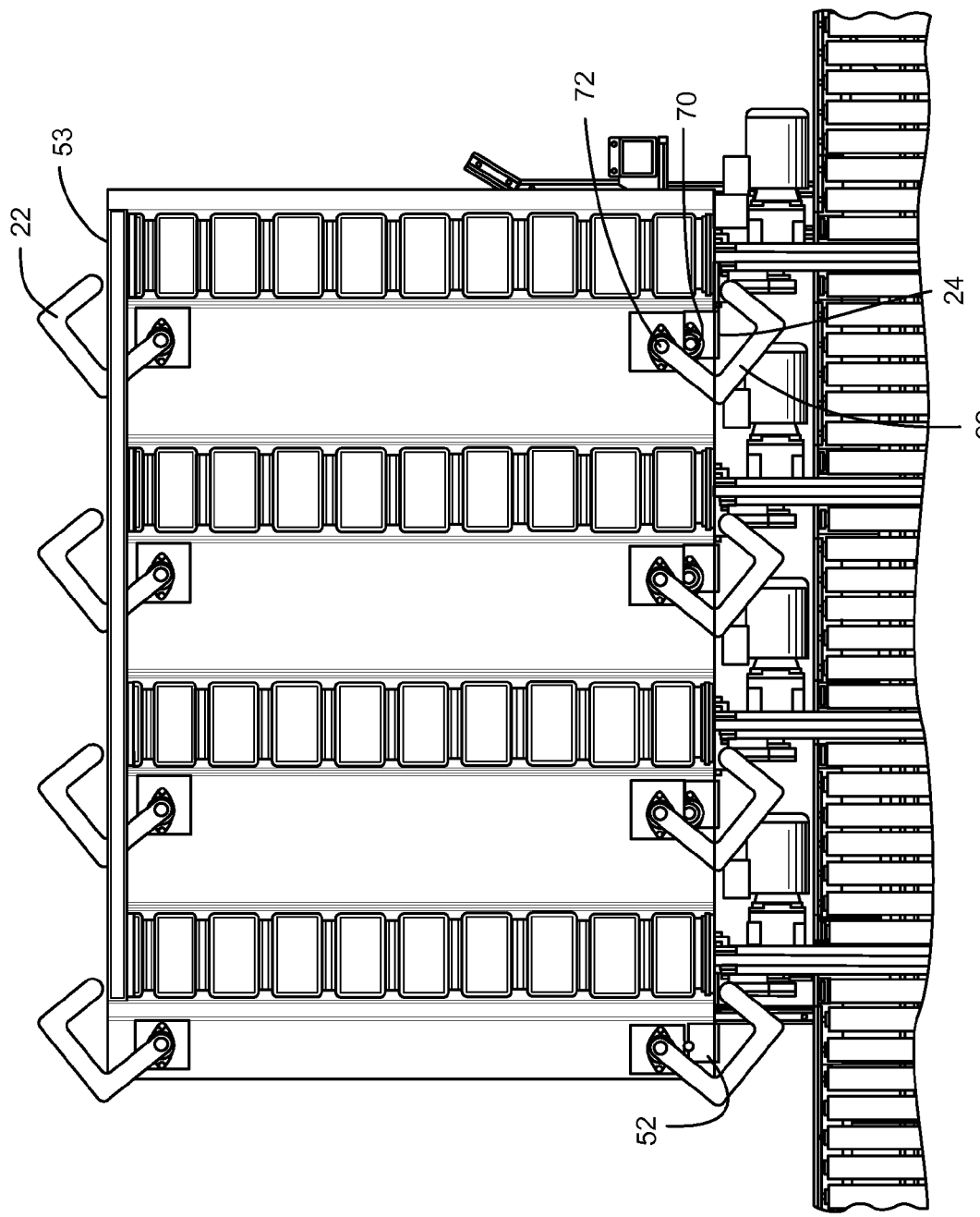
FIG. 11 is a top view of the mobile cart with the retention arms in an open position.

Once a pallet sleeve is fully discharged from its corresponding section 27a-d of the cart 20 the doors 24 close automatically. Each door is biased to the closed position so that once the pressure of the exiting pallet sleeve is removed the door rotates back to the closed position. In one embodiment, each door may be provided with a torsion spring or similar spring arrangement to bias the door closed. As depicted in FIGS. 11 and 12, as the doors 24 close this action of doors causes the retention arms 22, 23 to pivot outward, thereby releasing the front and back ends of the next pallet sleeve in the vertical stack in each section. The remaining pallet sleeves stored vertically in the sections 28 of the mobile cart 20 fall due to gravity. The next pallet sleeve is then aligned in front of door 24 and is available to be positioned underneath the next load L on the conveyor component 10.

Figure 13:
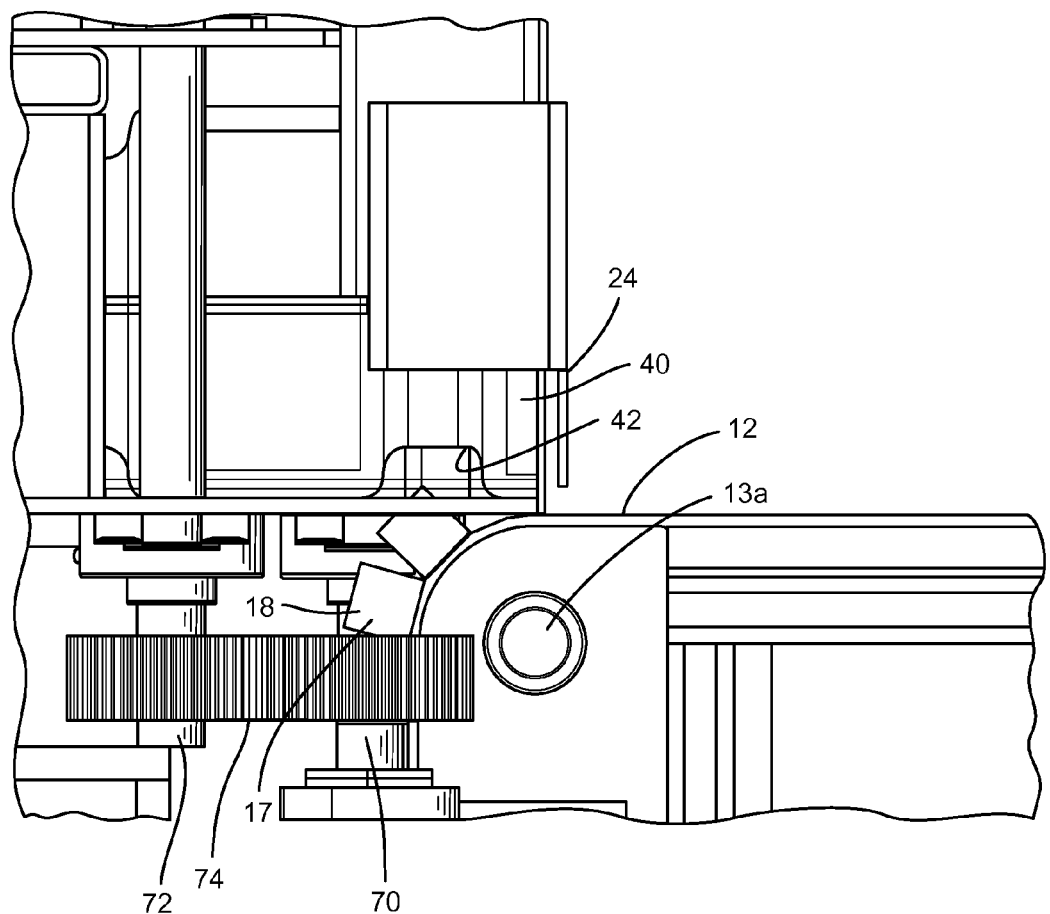
FIG. 13 is an enlarged view of the drive element engaging a pallet sleeve and a gear mechanism for the retention arms.

The depiction of drive element 12 in FIG. 13 provides one embodiment for the manner of engaging a pallet sleeve and withdrawing the sleeve from the cart onto the drive element 12. In this embodiment a sprocket 17 is mounted to the drive axle 13a of the drive motor 13 that rotates the drive element 12. The sprocket 17 is laterally offset from the drive element 12 (see, FIG. 8) and is situated to rotate underneath the cart 20 and pallet sleeve 20. The sprocket 17 includes teeth 18 that are configured to engage a notch 42 defined in the underside of the sleeve, as shown in FIG. 13. As the sprocket rotates, the teeth 18 pull the pallet sleeve out from the cart, pushing open the door 24. When the pallet sleeve is pulled far enough out from the cart it is engaged by the drive element 12 which continues to pull the pallet sleeve outward onto the conveyor.

The interrelationship between the retention arms 22 and cart doors 24 is shown in FIGS. 11 and 13. In particular, the doors are mounted on an axle 70, while the retention arms 22 are pivotably mounted on an axle 72. A gear train 74 connects the two axles 70, 72 so that rotation of axle 70 when a door 24 is opened causes commensurate rotation of the axle 72, and consequently pivoting of the retention arm 22. The gear train 74 is configured so that the door 25 and retention arm 22 pivot in opposite directions—i.e., as the door pivots outward to open the retention arm pivots inward to retain the next pallet sleeve in the vertical stack, and conversely when the door pivots inward to close.

Figure 14:
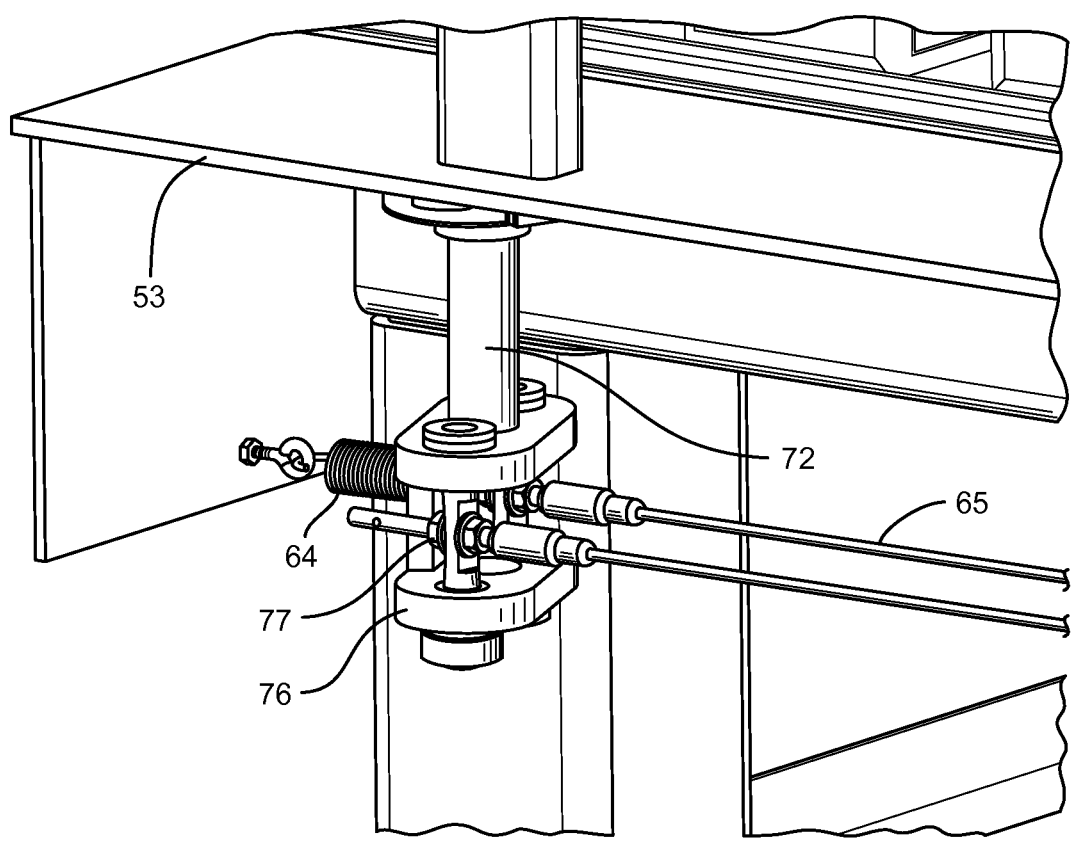
FIG. 14 is an enlarged view of a mechanism to retract a cart door and to rotate the retention arms on a mobile cart.

As shown in FIG. 11, retention arms 22 and 23 are provided on the front 52 and back 53 of the cart 20. The movement of the retention arms on the back are coordinated with the movement of the retention arms on the front so that the next pallet sleeve in the vertical stack is supported at its opposite ends, as shown in FIG. 7. The retention arms at the back 53 are also supported on an axle 72, as shown in FIG. 14. The axles 72 are all provided with a turnbuckle mounting structure 76 that connects one or more turnbuckle rods or cables 65 that span the cart from front to back. In other words, the rods 65 connect the axles 72 between the front and back to ensure mutual rotation of the axles and consequently the retention arms 22.

A turnbuckle arrangement 77 allows adjustment of the tension in each of the rods or cables 65. In one feature, the mounting structure 76 may be biased by a spring 64 grounded to the cart frame. The spring 64 biases the mounting structure, the axles 72 and consequently the retention arms to their open position (FIG. 11). This biasing then biases the door 25 to its closed position so that the door automatically closes when the pallet sleeve fully exits the cart 20.

The conveyor system 10 and cart 20 shown in FIG. 1 are configured to load one to four pallet sleeves beneath a particular load. Of course, the conveyor and cart may be configured to accommodate more than four pallet sleeves. The number and location of the pallet sleeves introduced under a load L is determined by which of the motors 13 is activated. It can be appreciated that the action of the doors 25 and retention arms 22 do not require their own power. Instead, the action of these components may be controlled by the motors 13 and particularly the drive elements 12 which engage a pallet sleeve and pull it from the cart. The activation of the motors 13 may be directly controlled by an operator, by a sensor system, or by a computer or microprocessor system. In some cases all of the motors are activated for every load L so that the full complement of pallet sleeves is provided for each load. In other cases, specific ones of the motors may be activated to introduce less than the full complement of sleeves, which may be a function of the length and overall size of the load L. A sensor system may sense the presence of the load and activate the motors accordingly. The sensor may also read indicia on the load to determine which combination of motors to activate to appropriately position pallet sleeves under the load.

Figure 15:
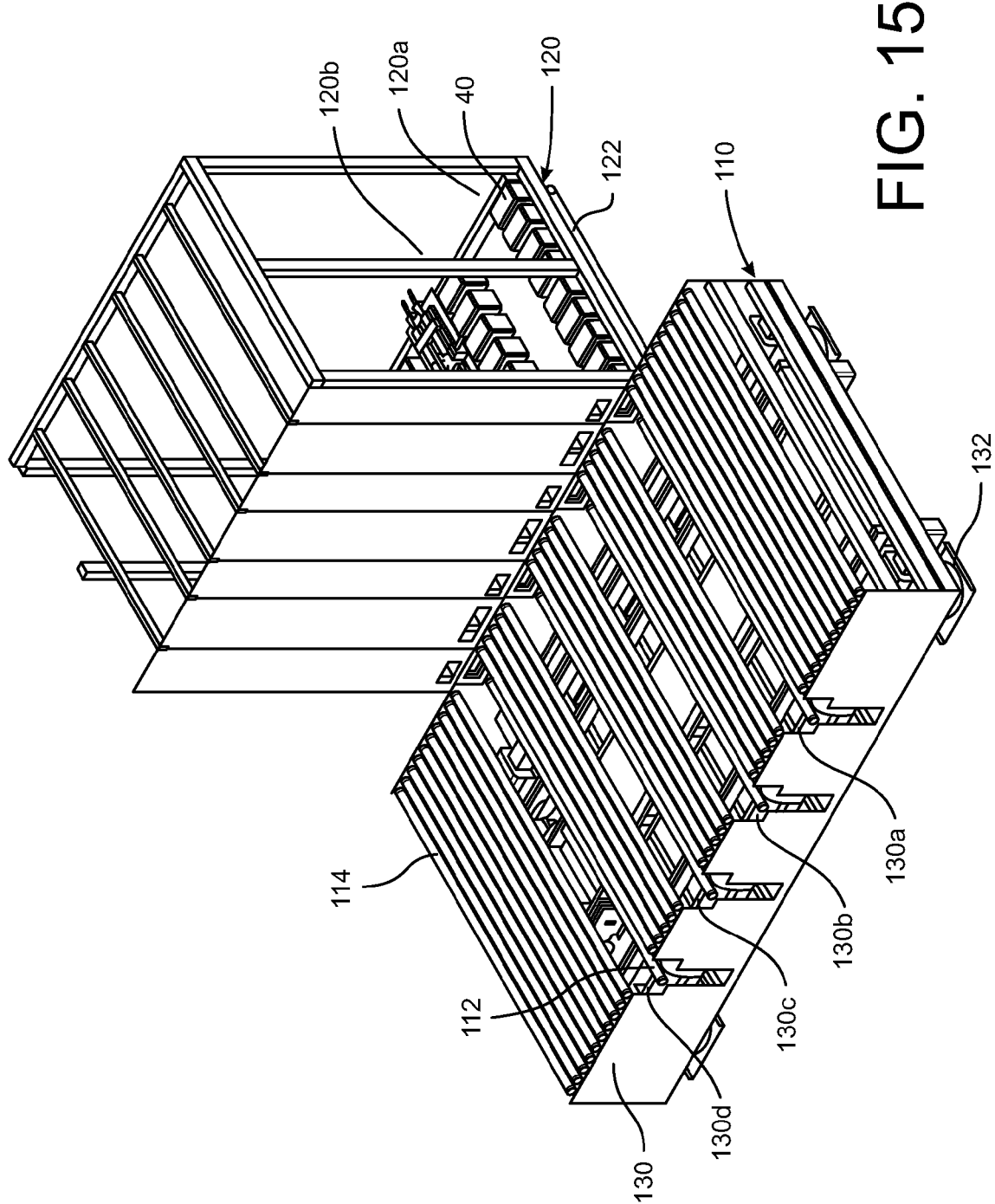
FIG. 15 is a perspective view of an apparatus according to a further embodiment.

In an alternative embodiment, a conveyor component 110 may include conveyor rollers 114 similar to the roller elements 14, as shown in FIG. 15. However, in this embodiment, the stations 130a-d may include conveyor rollers 112, similar to the other rollers. In this embodiment, the mechanism 132 for raising and lowering is coupled to the conveyor rollers 112 within the spaced apart stations 130a-d, so that it is the rollers supporting the pallet sleeves that are lowered while the remaining conveyor rollers 114 remain vertically stationary. The pallet sleeve conveyor rollers 112 may include drive motors for rotating the rollers when the load is supported on the pallet sleeves, or the conveyor rollers may be drive in combination with the rollers 114 of the remainder of the conveyor component 110.

Since the conveyor rollers 112 are configured for movement in the same direction as the other rollers 114, another drive element is provided for transferring the pallet sleeves 40 onto the conveyor component 110 underneath the load. In this embodiment, the drive element 122 is disposed within each station, such as stations 120a, 120b seen in FIG. 15. The drive element may be configured to engage the back or rear of each pallet sleeve to push the sleeve from the dispenser 120 to the conveyor component. Alternatively, the drive element 122 may be a belt conveyor aligned perpendicular to the travel direction of the conveyor component 110. The belt surface may contact and frictionally engage the underside of the lowermost pallet sleeve to push the sleeve out of the dispenser 120.

It is further contemplated that the dispenser 120 does not include a retention mechanism, as in the prior embodiment. Instead the vertical stack of pallet sleeves are held in position within the dispenser as the lowermost pallet sleeve is driven outward underneath the load. The stack falls by gravity as the lowermost sleeve moves from underneath the stack. The dispenser may be structured to define a close space around each stack of pallet sleeves so that the stack falls uniformly and without becoming wedged within the dispenser.

While the invention has been illustrated and described in detail in the drawings and foregoing description, the same should be considered as illustrative and not restrictive in character. It is understood that only the preferred embodiments have been presented and that all changes, modifications, and further applications that come within the spirit of the invention are desired to be protected.

What is claimed is:

1. An apparatus for dispensing a pallet sleeve beneath a load on a conveyor, comprising:
   a conveyor component including;
   conveyor elements configured to convey a load thereon in a first direction;
   one or more stations spaced apart along the first direction; and
   a mechanism for changing the relative vertical positions of said conveyor elements and said one or more stations; and
   a pallet sleeve dispenser configured for storing pallet sleeves in one or more spaced apart sections, each section aligned with a corresponding one of said stations when said pallet sleeve dispenser is disposed adjacent said conveyor component; and
   a drive element associated with each of said stations and configured to engage a pallet sleeve and drive the pallet sleeve from said dispenser to said conveyor component in a second direction substantially perpendicular to said first direction.

2. The apparatus of claim 1, wherein said drive elements are belt conveyors.

3. The apparatus of claim 1, wherein said drive elements are mounted within said conveyor component and extend outward therefrom to engage a pallet sleeve disposed within said dispenser when said dispenser is adjacent said conveyor component.

4. The apparatus of claim 1, wherein said drive elements are mounted within said dispenser and are arranged to contact a lowermost pallet sleeve within said corresponding station.

5. The apparatus of claim 1, wherein said pallet sleeve dispenser is configured to support pallet sleeves in a vertical stack in each of said sections.

6. The apparatus of claim 1, wherein said mechanism for raising and lowering includes one or more inflatable airbags.

7. The apparatus of claim 1, wherein:
   said conveyor component includes a frame supporting said conveyor elements; and
   said mechanism for raising and lowering is configured to raise and lower said frame.

8. An apparatus for dispensing a pallet sleeve beneath a load on a conveyor, comprising:
   a conveyor component including (i) conveyor elements configured to convey a load thereon in a first direction, (ii) one or more stations spaced apart along the first direction, and (iii) a mechanism for changing the relative vertical positions of said conveyor elements and said one or more stations;
   a pallet sleeve dispenser configured for storing pallet sleeves in one or more spaced apart sections, each section aligned with a corresponding one of said stations when said pallet sleeve dispenser is disposed adjacent said conveyor component; and
   a drive element associated with each of said stations and configured to engage a pallet sleeve and drive the pallet sleeve from said dispenser to said conveyor component in a second direction substantially perpendicular to said first direction,
   wherein said pallet sleeve dispenser is configured to support pallet sleeves in a vertical stack in each of said sections, and
   wherein said pallet sleeve dispenser is a mobile cart.

9. The apparatus of claim 8, wherein said conveyor component includes an alignment mechanism for engaging said mobile cart to align said one or more stations of said conveyor component with said one or more spaced apart sections of said dispenser.

10. An apparatus for dispensing a pallet sleeve beneath a load on a conveyor, comprising:
    a conveyor component including (i) conveyor elements configured to convey a load thereon in a first direction, (ii) one or more stations spaced apart along the first direction, and (iii) a mechanism for changing the relative vertical positions of said conveyor elements and said one or more stations;
    a pallet sleeve dispenser configured for storing pallet sleeves in one or more spaced apart sections, each section aligned with a corresponding one of said stations when said pallet sleeve dispenser is disposed adjacent said conveyor component; and
    a drive element associated with each of said stations and configured to engage a pallet sleeve and drive the pallet sleeve from said dispenser to said conveyor component in a second direction substantially perpendicular to said first direction,
    wherein said pallet sleeve dispenser is configured to support pallet sleeves in a vertical stack in each of said sections, and
    wherein said pallet sleeve dispenser includes a retention mechanism for supporting a pallet sleeve immediately above a pallet sleeve being engaged by said drive element.

11. The apparatus of claim 10, wherein said retention mechanism includes retention arms disposed at opposite ends of each of said stations, said retention arms operably mounted to said dispenser to move to and from a position engaging and supporting a pallet sleeve.

12. The apparatus of claim 11, in which the pallet sleeves have openings at their opposite ends thereof, and wherein said retention arms include a prong configured to seat within the opening at the end of a pallet sleeve.

13. The apparatus of claim 11, wherein:
    said dispenser includes a door pivotably mounted at each of said sections between said dispenser and said conveyor section, each door arranged on said dispenser to open when contacted by a pallet sleeve driven by said drive element in said second direction; and
    each retention arm is operably connected to a corresponding door so that said retention arms move to the position engaging a pallet sleeve when said door is opened.

14. The apparatus of claim 13, wherein:
    said retention arms include a front retention arm at a side of said dispenser adjacent said conveyor component and a rear retention arm at an opposite side of said dispenser;
    said front retention arm is directly operably connected to said corresponding door; and
    said rear retention arm is directly operably connected to said front retention arm so that when said front retention arm moves to the position engaging a pallet sleeve the rear retention arm also moves to the position engaging a pallet sleeve.

15. The apparatus of claim 13, wherein each door adjacent said conveyor component is pivotably mounted on an axle and each retention arm is pivotably mounted on a corresponding axle, and said retention mechanism includes a gear train operably connecting said axle of said door to said axle of said retention arm.

* * * * *